United States Patent
Nilsson et al.

(10) Patent No.: US 9,688,172 B2
(45) Date of Patent: Jun. 27, 2017

(54) FOLDABLE HEAD REST ASSEMBLY

(71) Applicant: Kongsberg Automotive AB, Mullsjö (SE)

(72) Inventors: Erik Nilsson, Jönköping (SE); Anders Kvarnström, Jönköping (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 223 days.

(21) Appl. No.: 14/761,131

(22) PCT Filed: Jan. 15, 2013

(86) PCT No.: PCT/EP2013/050617
§ 371 (c)(1),
(2) Date: Jul. 15, 2015

(87) PCT Pub. No.: WO2014/111125
PCT Pub. Date: Jul. 24, 2014

(65) Prior Publication Data
US 2015/0343928 A1    Dec. 3, 2015

(51) Int. Cl.
*B60N 2/48*    (2006.01)

(52) U.S. Cl.
CPC ......... *B60N 2/4855* (2013.01); *B60N 2/4858* (2013.01)

(58) Field of Classification Search
CPC .......................... B60N 2/4855; B60N 2/4858
USPC ....................................................... 297/403
See application file for complete search history.

(56) References Cited

U.S. PATENT DOCUMENTS

| 4,113,310 | A |   | 9/1978  | Kapanka |          |
|-----------|---|---|---------|---------|----------|
| 4,596,403 | A |   | 6/1986  | Dieckmann et al. | |
| 4,678,232 | A |   | 7/1987  | Ishida et al. |    |
| 5,681,079 | A | * | 10/1997 | Robinson | B60N 2/3013 |
|           |   |   |         |         | 297/378.12 |
| 6,902,232 | B2| * | 6/2005  | Kamrath | B60N 2/4858 |
|           |   |   |         |         | 297/61 |
| 7,325,877 | B2|   | 2/2008  | Brockman et al. | |

(Continued)

OTHER PUBLICATIONS

International Search Report for Application No. PCT/EP2013/050617 dated Oct. 10, 2013, 2 pages.

*Primary Examiner* — David R Dunn
*Assistant Examiner* — Tania Abraham
(74) *Attorney, Agent, or Firm* — Howard & Howard Attorneys PLLC

(57) ABSTRACT

The invention relates to a foldable head rest assembly (1) for a vehicle comprising a bracket (3), an armature (5) for carrying a head rest, a locking mechanism (33) and a release mechanism, wherein the armature comprises a first arm, which is mounted to the bracket by an armature shaft (17) and pivotable with respect to the bracket about a first axis (18) between an upright position and a folded position, wherein the first axis is defined by the armature shaft, wherein the locking mechanism (33) prevents pivoting of the armature from the upright position to the folded position and wherein the release mechanism (49) can move the locking mechanism from a locked position to an unlocked position, characterized in that an abutment surface (34) of the first arm abuts a locking shaft (31) in the upright position, the locking shaft extending along a second axis that extends parallel to and spaced apart from the first axis, and the release mechanism is mounted to the locking shaft (31) and pivotable about the second axis (32).

24 Claims, 4 Drawing Sheets

(56) References Cited

U.S. PATENT DOCUMENTS

| | | | |
|---|---|---|---|
| 7,543,891 B2* | 6/2009 | Chung | B60N 2/4858 297/378.12 |
| 7,575,282 B2* | 8/2009 | Sutter, Jr. | B60N 2/4873 297/403 |
| 7,717,516 B2* | 5/2010 | Sutter, Jr. | B60N 2/4855 297/403 |
| 7,740,319 B2* | 6/2010 | Furukawa | B60N 2/20 297/391 |
| 8,002,256 B2 | 8/2011 | Sasahara | |
| 8,002,356 B2* | 8/2011 | Lutzka | B60N 2/4844 297/403 |
| 8,016,354 B2* | 9/2011 | Veluswamy | B60N 2/01583 297/320 |
| 8,104,836 B2* | 1/2012 | Little | B60N 2/4855 297/408 |
| 8,197,001 B2* | 6/2012 | Grable | B60N 2/4858 297/378.1 |
| 8,197,007 B2* | 6/2012 | Lutzka | B60N 2/4844 297/391 |
| 8,226,170 B2* | 7/2012 | Lutzka | B60N 2/3009 297/403 |
| 8,465,098 B2* | 6/2013 | Yetukuri | B60N 2/4855 297/331 |
| 8,511,751 B2* | 8/2013 | Bruck | B60N 2/4855 297/391 |
| 2008/0036263 A1 | 2/2008 | Little | |

* cited by examiner

FOLDABLE HEAD REST ASSEMBLY

CROSS-REFERENCE TO RELATED APPLICATIONS

The subject patent application claims priority to and all the benefits of Patent Application No. PCT/EP2013/050617, which was filed on Jan. 15, 2013 with the European Patent Office, the disclosure of which is hereby incorporated by reference.

TECHNICAL FIELD

The present invention relates to a foldable head rest assembly for a vehicle comprising a bracket, an armature for carrying a head rest, a locking mechanism and a release mechanism, wherein the armature comprises a first arm, which is mounted to the bracket by an armature shaft and pivotable with respect to the bracket about a first axis between an upright position and a folded position, wherein the first axis is defined by the armature shaft, wherein the locking mechanism in at least one locking position engages with the first arm of the armature, thereby preventing pivoting of the armature from the upright position to the folded position, and in at least one unlocked position does not prevent pivoting of the armature and wherein the release mechanism can move the locking mechanism from the at least one locked position to at least one of said unlocked positions.

The present invention relates to foldable head rest assemblies i.e. head rest assemblies that are orbitable between an upright or in-use position and a folded position with respect to the back rest to which they are attached. In the folded position the head rest does not obscure the line of sight of the driver and/or facilitates folding of the vehicle seats to provide space for further luggage or other goods to be loaded into the vehicle. In the in-use or upright position the head rest supports the head of a person sitting on the seat which can be safety relevant e.g. in case of an accident or emergency breaking.

BACKGROUND OF THE DISCLOSURE

Foldable head rest assemblies have been known in the prior art for quite some time. U.S. Pat. No. 7,325,877 B2 discloses a foldable head rest assembly for a vehicle that comprises a bracket and an armature attached to the bracket. The armature is pivotable about a first axis and connected to the bracket by means of an armature shaft. The armature shaft is not formed from a single piece but split up into two separate pieces, each piece connecting one of the two arms of the armature to the bracket. The head rest assembly further comprises a locking mechanism that can engage with one arm of the armature to lock the armature in an upright or in-use position. To be able to pivot or orbit the armature into a folded position a release mechanism is provided that can move the locking mechanism from a locked position to an unlocked position. In the upright position an abutment surface of the arms of the armature engages with the bracket to prevent further pivoting or tilting away from the folded position, wherein the locking mechanism prevents any pivoting towards the folded position.

For a secure locking of the armature in the upright position the armature shaft needs to be precisely arranged between the locking shaft and the bracket. Any deviation from the design distances of the shafts and the bracket may lead to a failure of the locking mechanism. Hence, a secure locking depends at least on the position of the armature shaft with respect to the bracket and the locking shaft and, in particular, the engaging surfaces provided on the bracket, the arms and the locking mechanism. Said arrangement is, however, prone to deviations due to tolerances in the production of the elements of the head rest assembly. With an increasing number of parts that have to be exactly aligned with respect to one another the risk of a failure of the locking mechanism increases.

U.S. Pat. No. 8,002,256 B2 also discloses a foldable head rest assembly for a vehicle comprising a bracket and an armature mounted to said bracket. The armature carries a head rest and is movable between a folded position and an upright or in-use position. The armature is pivoted with respect to the bracket about a first axis. The head rest assembly further comprises a locking mechanism having a locked and an unlocked position. The locking mechanism engages with a locking element that is attached to an armature shaft to which the first arm and the second arm of the armature are connected. The locking mechanism does not directly engage with any of the arms of the armature. Instead the locking element and the armature are rotatably connected by means of the armature shaft. To move the locking mechanism from the locked to the unlocked position a release mechanism is provided that is pivotable about the first axis.

Another head rest assembly is known from U.S. 2008/0036263 A1. The foldable head rest assembly disclosed therein also comprises a bracket and an armature for carrying a head rest. The armature is pivotable with respect to the bracket about a first axis between an upright position and a folded position. In the upright position an abutment surface of each arm of the armature engages with the bracket to prevent further movement or pivoting of the armature away from the folded position. Pivoting of the armature towards the folded position can be restricted by a locking mechanism. The locking mechanism is pivotable about a second axis that extends in parallel to the first axis and is spaced apart from the first axis. The locking mechanism engages with the first arm of the armature and prevents any movement of the armature towards the folded position. To move the locking mechanism from the locked position to the unlocked position a release mechanism that is pivotable about a second axis has to be turned.

SUMMARY OF THE DISCLOSURE

In light of the above, it is an objective of the present invention to provide a simple yet effective foldable head rest assembly that provides an efficient design. Furthermore, the head rest shall be robust in operation in view of potential deviations in the exact arrangement of the parts with respect to one another due to production tolerances and easily and cost-effectively produced.

The problem is solved by providing a foldable head rest assembly wherein an abutment surface of the first arm abuts a locking shaft in the upright position, wherein the locking shaft defines a second axis and is mounted to the bracket. The second axis extends parallel to and spaced apart from the first axis. Further, the release mechanism is mounted to the locking shaft and pivotable about the second axis.

The foldable head rest assembly according to the present invention comprises a bracket that is preferably adapted to be mounted to the back rest of a vehicle seat and an armature for carrying a head rest. The armature comprises a first arm that is preferably J-shaped, wherein the long end of the "J" forms the first end of the arm and the short or curved end of the arm forms a second end. The curvature of the J can, for example, follow a curve having the same distance from the first axis about which the armature is pivoted, such that width of the arm of the armature that protrudes out of the back rest of the vehicle seat and the place where the arm protrudes out of the back rest are maintained while the head rest is pivoted. In such a manner, the holes required in the back rest can be minimized.

The second end of the arm is connected to the bracket by means of an armature shaft. The armature is pivotable with respect to the bracket about a first axis between an upright position or in-use position and a folded position. In other words, the rotational center of the armature shaft defines the first axis about which the armature pivots or tilts with respect to the bracket.

The head rest assembly further comprises a locking mechanism that can be moved into at least one locked position or into at least one unlocked position. In each of said locked positions the locking mechanism engages with the first arm of the armature, whereby any pivoting of the armature from the upright position to the folded position is prevented. The locking mechanism can either directly engage with a surface of the first arm or it may engage with any kind of locking means or locking element attached to or comprised in the first arm. If the locking mechanism is moved to one of said unlocked positions, it does not prevent pivoting of the armature anymore. It does, in particular, not prevent any pivoting from the upright or in-use position to the folded position. The term locked position refers to all positions wherein the locking mechanism locks or arrests the armature in the upright position. Likewise, the term unlocked position refers to all positions in which the armature can turn or pivot from the upright to the folded position. An exemplary embodiment of the present invention may comprise only one locked and one unlocked position. However, in a preferred embodiment the locking mechanism comprises a plurality of locked and/or unlocked positions.

In the upright position the first arm of the armature and to be more precise an abutment surface of the first arm abuts or engages with a locking shaft. The center of the locking shaft defines a second axis that extends in parallel to the first axis and is spaced apart form the first axis. The engagement of the abutment surface with the locking shaft restricts the tilting or pivoting of the armature or the head rest away from the folded position beyond the upright position. Hence, in the upright position the armature is locked or held between the locking shaft on the one side and the locking mechanism on the other side, if the locking mechanism is in one of said locked positions.

To move the head rest or the armature to the folded position from the upright position the locking mechanism has to be turned or moved into one of said unlocked positions. For this purpose a release mechanism is provided that can move the locking mechanism from a locked position to at least one of said unlocked positions. The release mechanism is mounted to the locking shaft and pivotable about the second axis. Hence, the release mechanism is attached to the same locking shaft that provides a stop for the first and the second arm's abutment surface and that prevents further tilting away of the armature from the folded position.

The foldable head rest assembly according to the present invention is advantageous as it provides a compact design. The locking shaft serves at the same time as a second axis about which a release mechanism can be pivoted and as a stopping means for the first arm. Securely arresting the armature in the upright position is less sensitive to small deviations from the design specifications in the production as the locking mechanism predominantly relies on the arrangement of the locking shaft with respect to the armature shaft. In contrast to prior art head rest assemblies the exact arrangement with respect to the bracket or a third shaft is of less importance. The head rest assembly can further be manufactured with less effort than comparable head rest assemblies known in the prior art which renders it more cost-effective.

In a preferred embodiment the bracket comprises a first mounting mechanism for mounting the armature shaft and the locking shaft to the bracket. The mounting mechanism that may be formed integrally with the bracket or as a separate entity provides a connection between the bracket, the locking shaft and the armature shaft. Further elements of the head rest assembly can also be attached directly to the mounting mechanism or indirectly by the locking shaft or the armature shaft. The mounting mechanism is preferably arranged at the respective ends of the locking shaft and the armature shaft to provide a robust mounting.

In the further preferred embodiment the mounting mechanism comprises a first and a second wall and each of the walls includes an aperture for receiving the armature shaft and an aperture for the locking shaft, i.e. each wall includes two apertures or openings. Hence, each shaft is held or supported on either end by two openings, one in each wall. This allows for an even more robust mounting of a shaft. Furthermore, any forces that are brought onto any of the shafts between the walls will be directly transferred to the mounting mechanism and the bracket and do no deform the shaft.

In the preferred embodiment the first arm is received between the first and the second wall of the first mounting mechanism. Thereby, the first and the second wall of the mounting mechanism can provide guidance or lateral support for the first arm of the armature. In an exemplary embodiment the first arm is formed from metal sheets that provide an extensive lateral surface area that can be interfacing with the first and/or the second wall of the first mounting mechanism to provide lateral support.

The first mounting mechanism is preferably formed by a single folded sheet of metal. In an exemplary embodiment the apertures through both sheets are created by punching them through the folded sheets. In such a manner, it is ensured that the apertures are aligned.

It is further preferred that the locking mechanism is received between the first and the second wall of the first mounting mechanism. Thereby, the locking mechanism can directly engage with the first arm or an exemplary locking mechanism attached to the first arm. Provided that the spacing of the first and the second wall of the first mounting mechanism is sufficiently narrow, the locking mechanism, the first arm and the first and the second wall are directly interfacing one another. Thereby, both the locking mechanism and the first arm are provided with lateral support or guiding in either direction perpendicular to the rotational or pivoting movement.

It is further preferred that the head rest assembly includes a second arm and a second locking mechanism. The second arm is mounted to the bracket by the armature shaft and pivotable with respect to the bracket about the first axis between an upright and a folded position. An abutment surface of the second arm abuts the locking shaft in the upright position. The second locking mechanism engages with the second arm of the armature in at least one locked position and prevents pivoting of the armature from the upright position to the folded position. In at least one unlocked position, the second locking mechanism does not prevent pivoting of the armature. The release mechanism can move the second locking mechanism from the at least one locked position to at least one of said unlocked positions.

In this preferred embodiment the head rest assembly includes a second arm which preferably extends in parallel to the first arm. In an exemplary embodiment the second arm is formed identical to the first arm and shares the first arm's advantages. Two arms that are preferably spaced apart from one another increase the rigidity of the head rest assembly. For further increasing the rigidity of the head rest assembly a cross rod can, for example, be attached between the first ends of the first and the second arm. The second arm is mounted to the bracket by the armature shaft which may to this end be formed as a single piece connecting the first and the second arm to the bracket or as two pieces, each piece connecting one of the arms to the bracket. In either way, the armature shaft defines with the first axis a common pivoting axis for the first and the second arm.

The second locking mechanism provides an addition to the locking mechanism that engages with the second arm instead of the first arm. The second locking mechanism can be moved to an unlocked position by the same release mechanism that is already moving the first locking mechanism. Providing two locking mechanisms is advantageous as the head rest or the armature and, in particular, the first and the second arm of the armature are locked or blocked simultaneously on either side from moving from an upright position to a folded position. If only one of the arms is blocked the head rest or the armature may pivoted unilaterally i.e. twisted which could results in shear forces acting onto the arms and other elements of the head rest assembly which could lead to permanent damage.

Preferably, the head rest assembly includes a second mounting mechanism for mounting the armature shaft and the locking shaft to the bracket. The second mounting mechanism includes a first and a second wall each comprising an aperture for receiving the locking shaft and the armature shaft. The second arm is received between the first and the second wall of the second mounting mechanism which is, preferably, formed from a single folded sheet of metal. The second mounting mechanism may, for example, be formed similar to the first mounting mechanism and advantageously provides guidance or lateral support to the second arm.

It is further preferred that the second locking mechanism is received between the first and the second wall of the second mounting mechanism. Arranging the second locking mechanism between the first and the second wall of the second mounting mechanism is advantageous for the same reasons as arranging the locking mechanism between the first and the second wall of the first mounting mechanism.

In a preferred embodiment the locking mechanism or each of the locking mechanism includes a lever mounted to the locking shaft that is pivotable about the second axis. The lever can be pivoted to at least one locked position such that a retaining surface of the lever can engage with a locking surface of the respective arm thereby preventing a pivoting of the armature away from the locking shaft. The lever can further be pivoted to at least one unlocked position such that the armature can be pivoted from an upright to a folded position. The locking surface is preferably formed by a locking element and more preferably by a rivet attached to the respective arm.

In this preferred embodiment the locking mechanisms are provided in form of a lever that is, like the release mechanism, pivotable or tiltable about the second axis. The locking mechanism can, for example, be formed as a metal sheet or from a plurality of metal sheets that smoothly fit between the first and the second walls thereby providing together with the walls lateral support for the arms. The locking surface on the arm can be a locking element attached to the arm. A locking element could be any kind of suitable elevation in the surface of the arm or preferably, a rivet attached to the respective arm. It is preferred to use a rivet instead of deforming the sheets forming the arms as this allows for a simplified production.

In an exemplary embodiment in the at least one locked position the retaining surface of the lever is arranged between the locking surface and the second axis. Trying to move the head rest or the armature from the upright to the folded position while the lever is in engagement with the locking surface only results in pushing forces acting from the retaining surface directly towards the second axis and onto the locking shaft. Hence, the exemplary embodiment of a lever can be rather light weight as it only needs to transfer a pressure force directly acting onto the locking shaft. In contrast to other locking elements where the force acting from the locking surface is not directed towards the locking shaft, no pulling forces that could easily deform the lever are expected. Therefore, a lever according to the exemplary embodiment can be robust and light weight at the same time.

In a preferred embodiment the lever or each lever includes a cam surface. The cam surface is adapted to engage with the respective arm of the armature when the armature is pivoted from a folded position to an upright position whereby the lever is pivoted to one of said unlocked positions. In other words, one of the surfaces of the lever that is not the retaining surface is designed such that the arm or a locking surface or a locking element attached to the arm can slide along the cam surface and push the lever out of the way, such that the armature can be moved from the folded to the upright position. It is advantageous to provide a cam surface as a user trying to pivot the armature or the head rest from a folded to an upright position does not need to actuate the release mechanism at the same time. In a way, the cam surface serves as a second release mechanism that is automatically actuated by the armature or the arms of the armature.

It is further preferred that the distance of the retaining surface of the lever or each lever is delimited by a first and a second end. The distance of the retaining surface from the second axis increases from the first end towards the second end. The second end is formed as a nose, wherein the nose and the retaining surface form a recess for receiving the locking surface of the respective arm. The preferred embodiment provides an advantageous design of a lever serving as a locking mechanism.

The retaining surface of the lever has a first end and a second end. The second end is formed as a nose or a protrusion that serves as an end stop for a rotation or a pivoting of the lever about the second axis when it engages with the locking surface on the respective arm. Thereby, it is ensured that the lever does not pivot or tilt further than intended and accidentally releases the armature from the upright position.

From the first end until the nose protrudes out of the lever at the second end the distance of the retaining surface from the second axis or the locking shaft increases. In other words, the distance of the retaining surface is shortest where the retaining surface comes first into contact with the locking surface when the armature is pivoted from the folded position to the upright position.

In an exemplary embodiment the shape of the retaining surface from the first end towards the nose could also be described as having a curvature which has a center of curvature which lies outside the second axis i.e. the pivot axis of the lever. Such a surface can also be referred to as an off-center locking surface.

Furthermore, the increase in distance of the retaining surface and the engagement of the first and the second arm with their abutment surface at the first shaft advantageously provide a wedging of the arms between the locking shaft and the levers. The preferred embodiment of the locking lever provides a locking element that ensures a safe locking of the first and/or second arm in an upright position. A secure locking of the arms in the upright position depends on the distance between the second axis and the locking surface in the upright position. This distance may vary due to production tolerances or irregularities. The preferred embodiment of the locking lever therefore provides the retaining surface in varying distance from the second axis. When pivoting the lock lever from the unlocked towards the locked position, the lock lever will pivot past the locking surface with the first end of the retaining surface forward. Due to the increasing distance between the retaining surface and the second axis the retaining surface will eventually engage with the locking surface if pivoted further. However, if the distance between the second axis and the locking surface in the upright position exceeds the maximum distance of the retaining surface from the second axis the nose formed at the second end of the retaining surfaces provides a safeguard preventing over-rotation.

It is further preferred that the locking mechanism or each of the locking mechanisms is connected to the release mechanism by a finger and receptacle connection, wherein a finger is attached to one of the locking mechanism and the release mechanism and a receptacle is provided on the other of the locking mechanism and the release mechanism. The finger engages with the receptacle for transmitting any pivoting of the release mechanism about the second axis to the locking mechanism. In an exemplary embodiment the finger and/or the receptacle are slightly chamfered, such that the finger is always rigidly received in the receptacle, even if one of the sizes of the receptacle or the finger does slightly deviate due to production errors. A finger and receptacle connection provides a simple yet robust way of transferring rotation between the release mechanism and the locking mechanism, in particular if a wall of the mounting mechanism is arranged between the release mechanism and the locking mechanism.

In a further preferred embodiment the release mechanism includes a sleeve receiving the locking shaft. It is, for example, conceivable that the locking shaft includes two rather short shaft pieces, that provide a mounting of the release mechanism to both mounting mechanism and the two pieces of the shaft are connected by the sleeve of the release mechanism.

In an exemplary embodiment a protrusion extends in radial direction out of a central element of the sleeve. The protrusion includes an attachment device for attaching an end of an actuation cable thereto, such that a pull movement of the actuation cable will result in a pivotal movement of the sleeve.

In a further preferred embodiment the release mechanism comprises an elastic element for biasing the release mechanism towards moving the locking mechanisms towards said locked positions. Such an elastic element could, for example, be formed by a simple spring that biases the orbiting of the release mechanism towards a desired direction. It is preferred to bias the release mechanism such that it moves the locking mechanism to a locked position to provide an automatic locking of the locking mechanism when the head rest is pivoted from a folded to an upright position.

It is further preferred that one or a plurality of elastic elements are provided for biasing the armature towards a folded position. For instance, a torsion spring could be disposed around the armature shaft and connected on the one hand to the bracket and on the other hand to the armature shaft. In another exemplary embodiment the elastic element is directly connected to the armature and to the bracket. The elastic element of the plurality of elastic elements can bias the armature towards a folded position, such that upon actuating the release mechanism the head rest is automatically pushed into the folded position, which is of particular advantage if a remote actuation mechanism is used.

BRIEF DESCRIPTION OF THE DRAWINGS

An exemplary embodiment of a foldable head rest assembly for a vehicle according to the present invention will now be described with reference to the accompanying drawings of which

DETAILED DESCRIPTION OF THE DISCLOSURE

Figure 1:
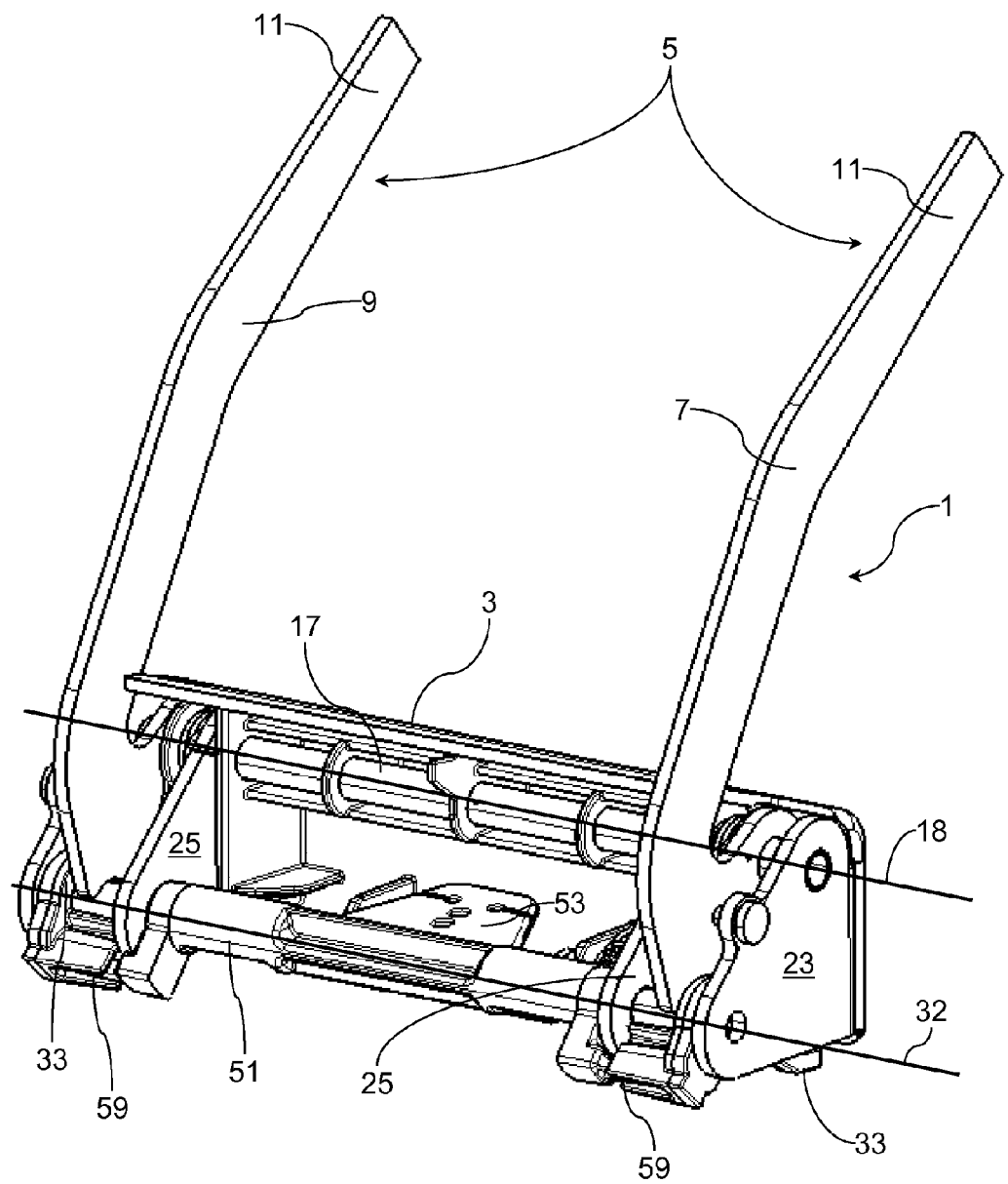
FIG. 1 is a schematic perspective view of an exemplary embodiment of a foldable head rest assembly according to the present invention.

An exemplary embodiment of a foldable head rest assembly 1 according to the present invention will now be described with reference to FIGS. 1 to 5. The foldable head rest assembly 1 comprises a bracket 3 that can be mounted to a back rest or seat back of a vehicle seat. The head rest assembly 1 further comprises an armature 5 having a first arm 7 and a second arm 9. The first and the second arm 7, 9 extend further then shown in the Figures and are connected by a cross rod at a first end 11 for stabilizing the armature 5.

The first and the second arm 7, 9 are essentially J-shaped, with the first end 11 of the arms 7, 9 forming the long end of the J and the second end 13 that is connected to the bracket 3 forming the curved part of the J. The arms 7, 9 are preferably formed from a flat metal sheet. At the second end 13 each of the arms 7, 9 comprises an aperture 15 for receiving an armature shaft 17 that connects the armature 5 and, in particular, the arms 7, 9 of the armature 5 to the bracket 3. The center of rotation of the armature shaft 17 forms a first axis 18 about which the armature 5 is pivoted with respect to the bracket 3. The armature 5 can be pivoted from a folded to an upright position about the first axis 18. For mounting the armature shaft 17 and thereby the armature 5 to the bracket 3 a first mounting mechanism 19 and a second mounting mechanism 21 are provided. Each mounting mechanism 19, 21 comprises a first wall 23 and a second wall 25 that are formed from a single piece of folded metal. Any apertures in the first and second wall 23, 25 can advantageously be formed by punching through the folded metal sheet whereby it is ensured at the apertures are aligned to one another.

Each wall 23, 25 includes a first aperture 27 for receiving the armature shaft 17. Advantageously, and as can be seen best in FIG. 1, the arms 7, 9 are arranged between the first and the second wall 23, 25, respectively. The first arm 7 is, for example, arranged between the first wall 23 and the second wall 25 of the first mounting mechanism 19 and the second arm 9 is arrange between the first wall 23 and the second wall 25 of the second mounting mechanism 21. In such a manner, guiding or lateral support of the arms 7, 9 perpendicular to the axis of pivoting 18 is provided.

Figure 2:
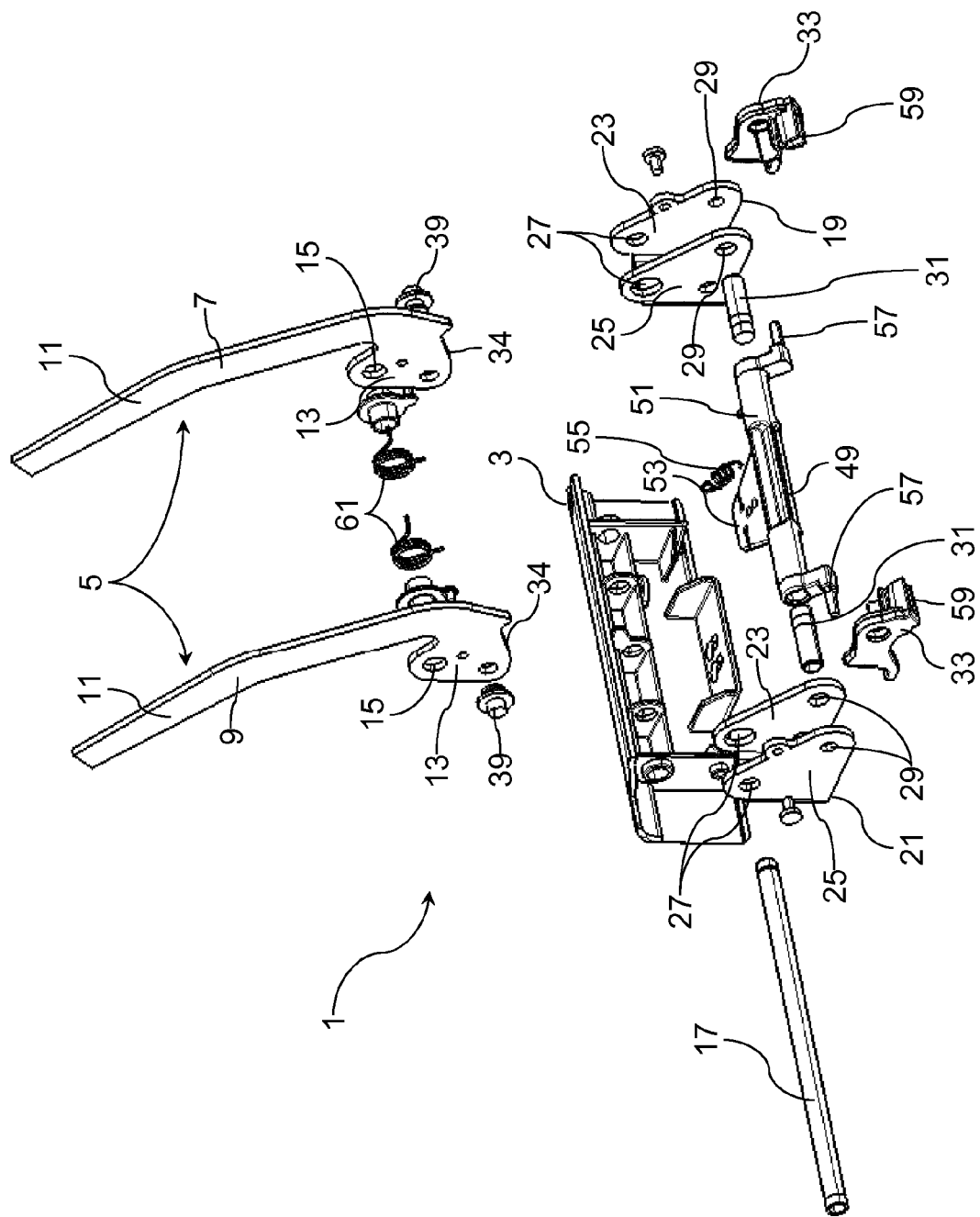
FIG. 2 is an explosion view of the exemplary embodiment according to the present invention.

The walls 23, 25 of the mounting mechanisms 19, 21 provide further openings or apertures 29 for attaching or mounting a locking shaft 31 to the bracket 3. The locking shaft 31 can be provided as a single piece connecting all four openings 29 or split-up into two pieces as shown in FIG. 2, wherein each of the pieces only connects the walls 23, 25 of the respective mounting mechanisms 19, 21. In either case, the locking shaft 31 defines a second axis 32 that extends parallel to and spaced apart from the first axis 18.

The locking shaft 31 could in principal be described as providing all means for locking the armature 5 in the upright or in-use position. Firstly, the locking shaft 31 provides a stopping means for arresting the armature 5 in its upright position i.e. any pivoting or tilting of the armature 5 further away from the folded position is hindered by abutment surfaces 34 of the arms 7, 9 that abut the locking shaft 31.

Secondly, two locking mechanisms 33 in form of levers 33 are also mounted by the locking shaft 31 to the mounting mechanisms 19, 21 and the bracket 3. The levers 33 are pivotable or rotatable about the second axis 32 and arranged between the first and the second wall 23, 25 of the mounting mechanisms 19, 21.

Each locking mechanism 33 engages in a plurality of locked position with one of the arms 7, 9 of the armature 5 and, thereby, prevents pivoting of the armature 5 from the upright position to the folded position. In a plurality of unlocked position the locking mechanisms 33 do not prevent pivoting or tilting of the arms 7, 9 of the armature 5.

Figure 3:
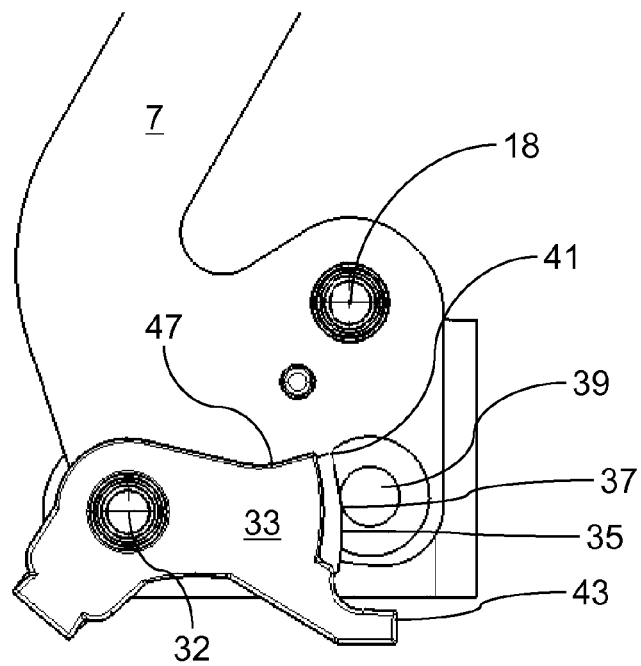
FIG. 3 is a side view of a locking means of the exemplary embodiment in a locked position.
Figure 4:
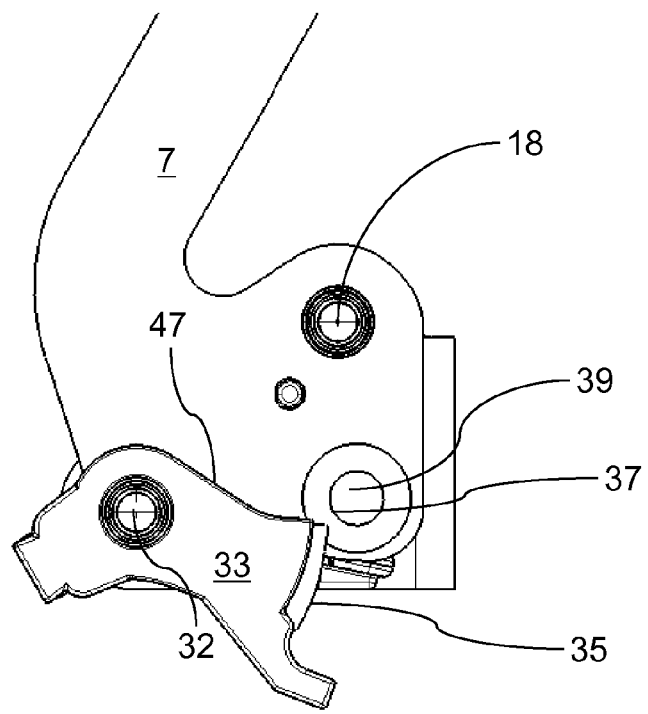
FIG. 4 is a side view of a locking means of the exemplary embodiment in an unlocked position and FIG. 5 is a detailed perspective view of one side of the exemplary embodiment according to the present invention.
Figure 5:
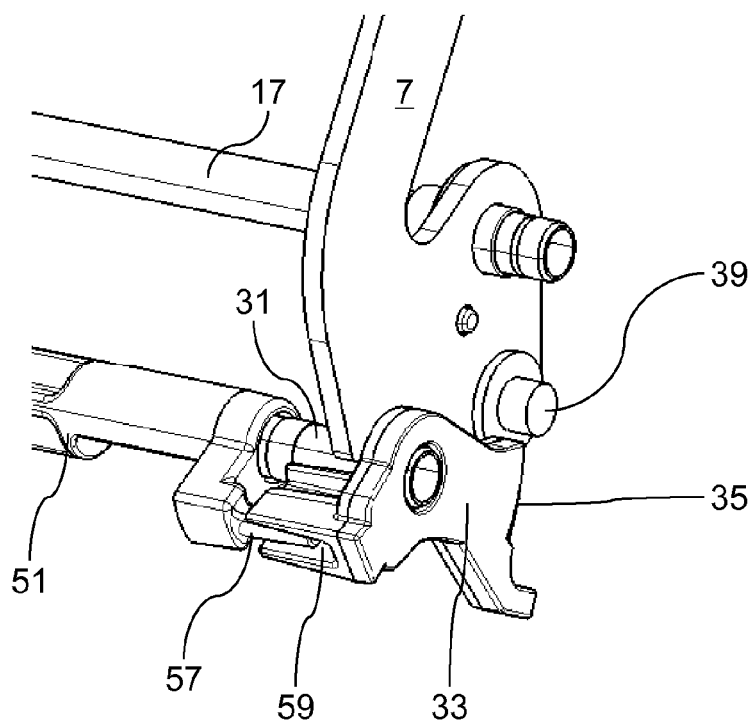

The exemplary embodiment of the locking mechanisms 33 is shown in more detail in FIGS. 3 and 4 that show a side view onto the first mounting mechanism 19 without the first wall 23. In FIG. 3 the lock lever or lever 33 is shown in one of said locked position and in FIG. 4 it is shown in one of said unlocked position. The lock lever 33 comprises a retaining surface 35 that engages with a locking surface 37 of the first arm 7. In the exemplary embodiment the locking surface 37 is formed by a rivet 39 that is attached to the second end 13 of the first and the second arm 7, 9.

The retaining surface 35 is delimited by a first end 41 and a second end 43. The second end 43 is formed as a nose protruding out of the lever 33 that delimits a pivoting of the lever 33 past the locking surface 37 or rivet 39. Between the first end 41 and second end 43 the distance of the retaining surface 35 from the second axis 32 increases. In the exemplary embodiment the retaining surface 35 has a curvature with a center of curvature that lies outside the second axis 32, i.e. it has an off-axis curvature. Upon pivoting from an unlocked to a locked position the lever 33 pivots with the first end 41 forward towards the locking surface 37 or rivet 39. The lever 33 continues to rotate past the locking surface 37 until the increasing distance between the retaining surface 35 and the second axis 32 equals the distance between the locking surface 37 and the second axis 32 and the retaining surface 35 and the locking surface 37 engage.

Hence, the increasing distance of the retaining surface 35 from the second axis 32 provides a secure and robust locking mechanism 33 that safely arrests the arms 7, 9 in the upright position and can compensate deviations in the production.

The retaining surface 35 is arranged between the locking surface 37 and the second axis 32 in said locked positions. Any force acting onto the armature 5 or the arms 7, 9 pushing the arms 7, 9 towards a folded position merely compresses the lever 33 towards the second axis 32. Hence, a sufficiently robust lever 33 can be lightweight as it receives lateral support from the walls 23, 25 and the lever 33 and is not subject to any pulling forces that could deform a hook or a nose formed by the lever 33 for holding the arms 7, 9 in an upright position.

In the upright position the arms 7, 9 are advantageously wedged between the locking shaft 31 and the levers 33 in said locked positions. Any tilting of the arms 7, 9 away from the folded position is hindered by the locking shaft 31 and any tilting towards the folded position pushes the lever 33 further towards the locked position. In this way, a self-restraining locking mechanism 33 is provided by the exemplary embodiment.

The lever 33 further comprises a cam surface 47. The cam surface 47 can engage with the locking surface 37 of the arms 7, 9 when the armature is moved from a folded position to an upright position thereby pushing the locking mechanism 33 into an open or unlocked position. Thereby, the cam surface 47 provides a means for tilting the head rest from a folded to an upright position without requiring the actuation of a release mechanism.

A release mechanism 49 is further provided to manually move the locking mechanism 33 from a locked to an unlocked position. The release mechanism 49 is formed as a sleeve 51 receiving the locking shaft 31 or the locking shaft parts 31. In the exemplary embodiment the sleeve 51 fills the gap between the first and the second mounting mechanisms 19, 21. The sleeve 51 and likewise the whole release mechanism 49 is pivotable or rotatable about the second axis 32. The sleeve 51 further includes a protrusion 53 extending radially out of the sleeve 51. The protrusion 53 connects a cable to the release mechanism 49, and the protrusion 53 can be used to actuate the release mechanism 49 and move the locking mechanisms 33 from a locked to an unlocked position. Further attached to the protrusion 53 is an elastic element or spring 55 that biases the release mechanism 49 such that it moves the locking mechanism 33 towards a locked position if it is not actuated. Thereby, the head rest assembly 1 is automatically locked in the upright position, if pushed from the folded to the upright position.

The release mechanism 49 comprises fingers 57 that are attached to the sleeve 51 and that engage with receptacles 59 formed at the locking mechanism 33. The finger 57 and receptacle 59 connection between the release mechanism 49 and the locking mechanism 33 provides for an efficient transmittance of a rotation or pivoting of the release mechanism 49 onto the locking mechanisms 33 despite the fact that the release mechanism 49 and the levers 33 are separated by one of the walls 23, 25 of the mounting mechanisms 19, 21. Preferably, the fingers 57 and/or the receptacles 59 are chamfered, such that the fingers 57 and the receptacle 59 rigidly engage, even if their sizes should deviate due to production errors.

The foldable head rest assembly 1 further comprises a first and a second elastic element 61 that are attached to the armature shaft 17. The elastic elements 61 are formed as torsion springs 61 that are disposed around the armature shaft 17 and connected on the one hand to the bracket 3 and on the other hand to the armature shaft 17. In such a manner, they bias the armature 5 towards a rotation into the folded position. Hence, after actuating the release mechanism 49 the head rest is automatically pivoted into the folded position.

The invention claimed is:

1. A foldable head rest assembly for a vehicle comprising:
   a bracket, an armature for carrying a head rest, a locking mechanism and a release mechanism,
   wherein the armature comprises a first arm, which is mounted to the bracket by an armature shaft and pivotable with respect to the bracket about a first axis between an upright position and a folded position,
   wherein the first axis is defined by the armature shaft,
   wherein the locking mechanism in at least one locked position engages with the first arm of the armature, thereby preventing pivoting of the armature from the upright position to the folded position, and in at least one unlocked position does not prevent pivoting of the armature, and
   wherein the release mechanism can move the locking mechanism from the at least one locked position to the at least one unlocked position,
   wherein an abutment surface of the first arm abuts a locking shaft in the upright position, the locking shaft being mounted to the bracket and defining a second axis, wherein the second axis extends parallel to the first axis and spaced apart from the first axis, and
   the release mechanism is mounted to the locking shaft and pivotable about the second axis.

2. The foldable head rest assembly according to claim 1, wherein the bracket comprises a first mounting mechanism for mounting the armature shaft and the locking shaft to the bracket.

3. The foldable head rest assembly according to claim 2, wherein the first mounting mechanism comprises a first wall and a second wall,
   wherein each one of the first wall and the second wall has an aperture for receiving the armature shaft and another aperture for receiving the locking shaft,
   wherein the first arm is received between the first wall and the second wall of the first mounting mechanism, and
   wherein the first mounting mechanism is formed from a single folded sheet of metal.

4. The foldable head rest assembly according to claim 3, wherein the locking mechanism is received between the first wall and the second wall, of the first mounting mechanism.

5. The foldable head rest assembly according to claim 3, wherein the locking mechanism comprises a lever mounted to the locking shaft and pivotable about the second axis,
   wherein the lever can be pivoted to at least one locked position such that a retaining surface of the lever can engage with a locking surface of the respective arm thereby preventing a pivoting of the armature away from the locking shaft,
   wherein the lever can be pivoted to at least one unlocked position such that the armature can be pivoted from the upright position to the folded position and
   wherein the locking surface is formed from one of a locking element and a rivet attached to the respective arm.

6. The foldable head rest assembly according to claim 2, wherein the head rest assembly comprises a second arm and a second locking mechanism,
   wherein the second arm is mounted to the bracket by the armature shaft and pivotable with respect to the bracket about the first axis between an upright position and a folded position,
   wherein an abutment surface of the second arm abuts the locking shaft in the upright position,
   wherein the second locking mechanism in at least one locked position engages with the second arm of the armature thereby preventing pivoting of the armature from the upright position to the folded position, and in at least one unlocked position does not prevent pivoting of the armature,
   wherein the release mechanism moves the second locking mechanism from the at least one locked position to the at least one unlocked position.

7. The foldable head rest assembly according to claim 6, wherein the head rest assembly further comprises a second mounting mechanism for mounting the armature shaft and the locking shaft to the bracket,
   wherein the second mounting mechanism comprises a first wall and a second wall,
   wherein each one of the first wall and the second wall has an aperture for receiving the armature shaft and another aperture for receiving the locking shaft,
   wherein the second arm is received between the first wall and the second wall of the second mounting mechanism and
   wherein the second mounting mechanism is formed from a single folded sheet of metal.

8. The foldable head rest assembly ROM according to claim 7, wherein the second locking mechanism is received between the first wall and the second wall of the second mounting mechanism.

9. The foldable head rest assembly according to claim 2, wherein the locking mechanism comprises a lever mounted to the locking shaft and pivotable about the second axis,
   wherein the lever can be pivoted to at least one locked position such that a retaining surface of the lever can engage with a locking surface of the respective arm thereby preventing a pivoting of the armature away from the locking shaft,
   wherein the lever can be pivoted to at least one unlocked position such that the armature can be pivoted from the upright position to the folded position and
   wherein the locking surface is formed from one of a locking element and a rivet attached to the respective arm.

10. The foldable head rest assembly according to claim 9, wherein the lever comprises a cam surface, the cam surface being adapted to engage with the respective arm of the armature when the armature is pivoted from the folded position to the upright position such that the lever is pivoted to the at least one unlocked position.

11. The foldable head rest assembly according to claim 9, wherein the distance of the retaining surface of the lever is delimited by a first end and a second end,
    wherein the distance of the retaining surface from the second axis increases from the first end towards the second end and the second end is formed as a nose, wherein the nose and the retaining surface form a recess for receiving the locking surface of the respective arm.

12. The foldable head rest assembly according to claim 2, wherein the locking mechanism is connected to the release mechanism by a finger and receptacle connection, wherein a finger is attached to one of the locking mechanism and the release mechanism and a receptacle is provided on the other of the locking mechanism and the release mechanism, and
  wherein the finger engages with the receptacle for transmitting any pivoting of the release mechanism about the second axis onto the locking mechanism.

13. The foldable head rest assembly according to claim 2 wherein the release mechanism comprises a sleeve receiving the locking shaft.

14. The foldable head rest assembly according to claim 2, wherein the release mechanism comprises an elastic element for biasing the release mechanism towards moving the locking mechanism into a locked position.

15. The foldable head rest assembly according to claim 2, further comprising at least one elastic element for biasing the armature towards a folded position.

16. The foldable head rest assembly according to claim 2, wherein the bracket is adapted to be mounted to a back rest of a vehicle seat.

17. The foldable head rest assembly according to claim 1 wherein the locking mechanism comprises a lever mounted to the locking shaft and pivotable about the second axis,
  wherein the lever can be pivoted to at least one locked position such that a retaining surface of the lever can engage with a locking surface of the respective arm thereby preventing a pivoting of the armature away from the locking shaft,
  wherein the lever can be pivoted to at least one unlocked position such that the armature can be pivoted from the upright position to the folded position and
  wherein the locking surface is formed from one of a locking element and a rivet attached to the respective arm.

18. The foldable head rest assembly according to claim 17, wherein the lever comprises a cam surface, the cam surface being adapted to engage with the respective arm of the armature when the armature is pivoted from the folded position to the upright position such that the lever is pivoted to the at least one unlocked position.

19. The foldable head rest assembly according to claim 17, wherein the distance of the retaining surface of the lever is delimited by a first end and a second end,
  wherein the distance of the retaining surface from the second axis increases from the first end towards the second end and the second end is formed as a nose, wherein the nose and the retaining surface form a recess for receiving the locking surface of the respective arm.

20. The foldable head rest assembly according to claim 1, wherein the locking mechanism is connected to the release mechanism by a finger and receptacle connection, wherein a finger is attached to one of the locking mechanism and the release mechanism and a receptacle is provided on the other of the locking mechanism and the release mechanism and
  wherein the finger engages with the receptacle for transmitting any pivoting of the release mechanism about the second axis onto the locking mechanism.

21. The foldable head rest assembly according to claim 1 wherein the release mechanism comprises a sleeve receiving the locking shaft.

22. The foldable head rest assembly according to claim 1, wherein the release mechanism comprises an elastic element for biasing the release mechanism towards moving the locking mechanism into a locked position.

23. The foldable head rest assembly according to claim 1, further comprising at least one elastic element for biasing the armature towards a folded position.

24. The foldable head rest assembly according to claim 1, wherein the bracket is adapted to be mounted to a back rest of a vehicle seat.

* * * * *

UNITED STATES PATENT AND TRADEMARK OFFICE
CERTIFICATE OF CORRECTION

PATENT NO. : 9,688,172 B2
APPLICATION NO. : 14/761131
DATED : June 27, 2017
INVENTOR(S) : Erik Nilsson et al.

Page 1 of 1

It is certified that error appears in the above-identified patent and that said Letters Patent is hereby corrected as shown below:

In the Claims

Column 12, Line 30 (Claim 8): delete "The foldable head rest assembly ROM according to" and insert therefor --The foldable head rest assembly according to--

Signed and Sealed this
Eighteenth Day of April, 2023

Katherine Kelly Vidal
*Director of the United States Patent and Trademark Office*